March 8, 1949.    H. L. HARDISTY    2,463,615
FLAG AND HANGER THEREFOR FOR USE ON LOADED VEHICLES
Filed Sept. 15, 1947    2 Sheets-Sheet 1
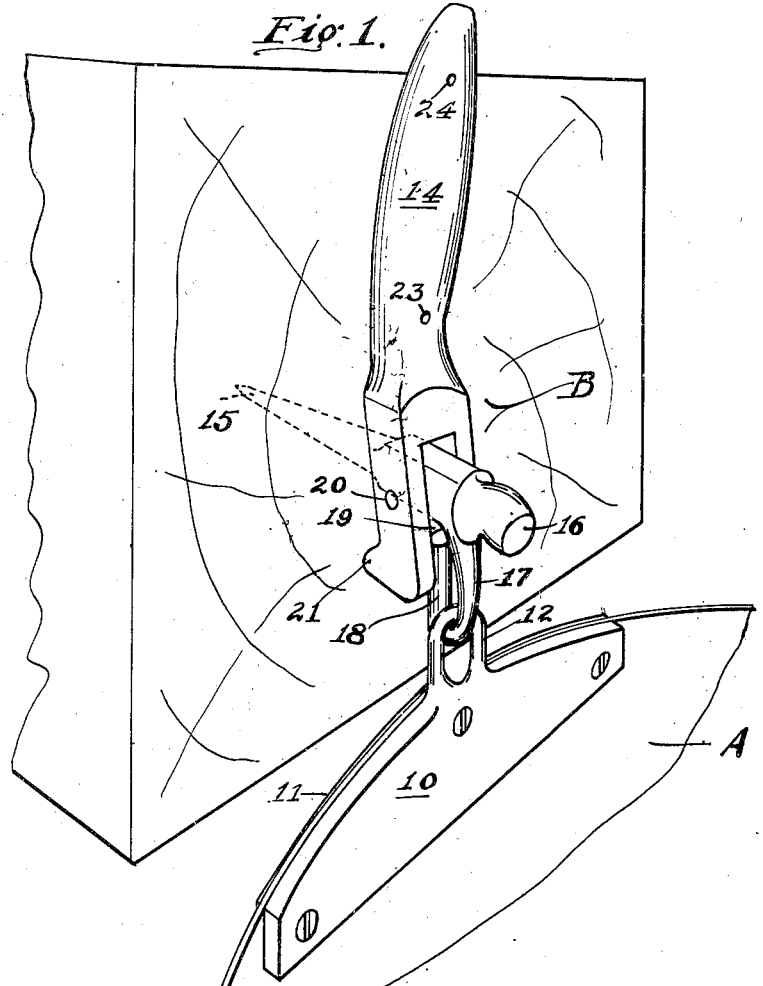
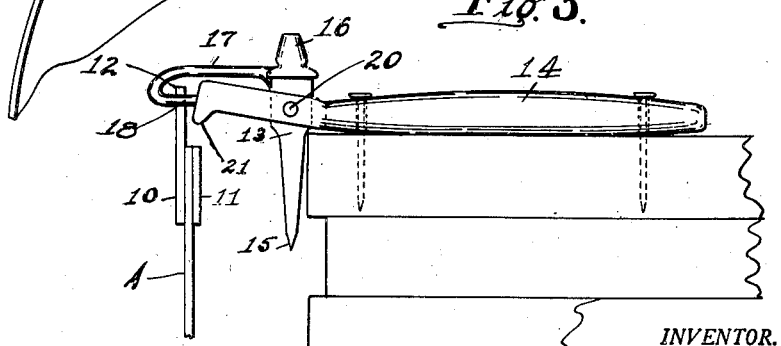
INVENTOR.
Henry L. Hardisty
BY
Munn, Liddy, Glaccum & Rich
Attys.

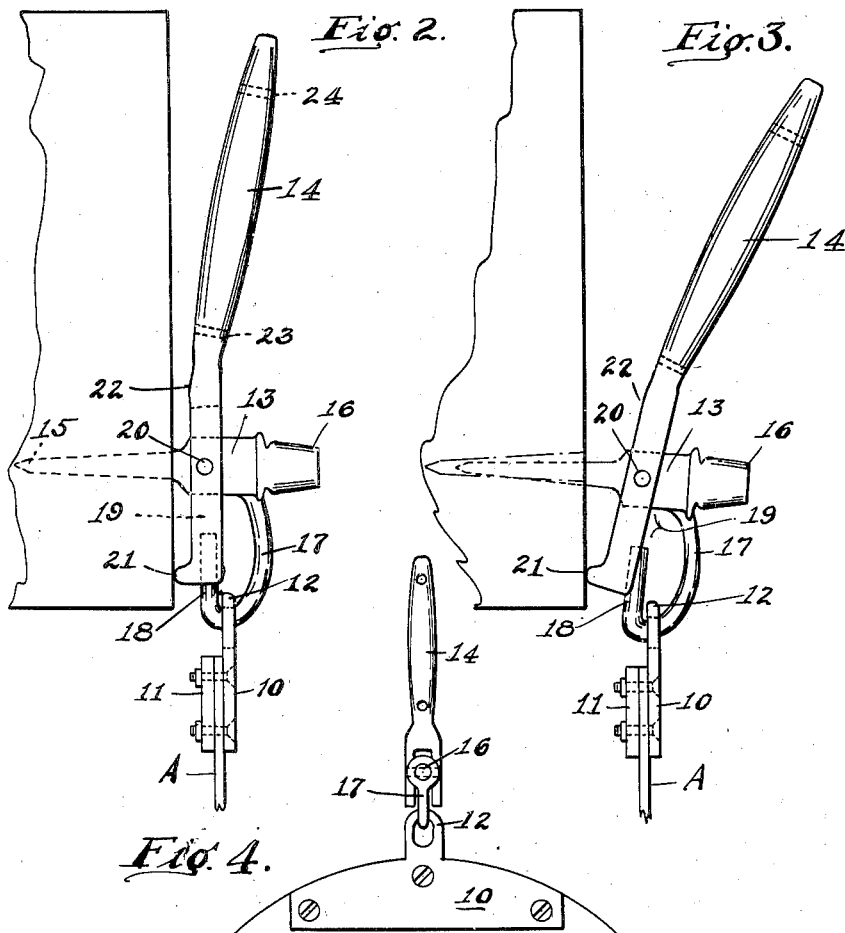

Patented Mar. 8, 1949

2,463,615

UNITED STATES PATENT OFFICE 2,463,615

FLAG AND HANGER THEREFOR FOR USE ON LOADED VEHICLES

Henry L. Hardisty, Portland, Oreg., assignor to Kittie Clida Hardisty, Portland, Oreg.

Application September 15, 1947, Serial No. 774,048

3 Claims. (Cl. 40—128)

My present invention has for its object to provide a signal device for use in conjunction with loaded vehicles to provide a visual means for attracting the attention of drivers of vehicles which may be following or other persons on a road or highway who may be approaching it from the rear, said device being particularly adapted for application to loads of material, such as, logs, lumber, or the like, the rear ends of which project beyond the vehicle chassis.

Another object of my invention is to provide a flag hanger particularly adapted for ready attachment to one of the several logs, timbers, or piling projecting beyond the rear end of a logging truck, or other vehicle, on which they are being transported, as a warning to persons, such as motorists particularly, who may be approaching the loaded vehicle from the rear.

To these and other ends my invention comprises further improvements and advantages as will be further described in the accompanying specification, the novel features thereof being set forth in the appended claims.

In the drawings:

Figure 1 is a perspective view of a signal device illustrating one embodiment of my invention.

Figure 2 is a detail side elevation of the hanger element, the parts being in their normal operative position.

Figure 3 is a similar illustration showing the lever arm in position for detaching the spike and freeing the hanger hook to release the flag.

Figure 4 is a face view of the flag proper.

Figure 5 is a side elevation showing the flag holder attached in a horizontal position on a load.

Similar reference numerals, in the several figures, indicate similar parts.

A menace to motor travel on any road is the overhanging or projecting ends of the loads carried on trucks which extend beyond the rear ends of the chassis of such vehicles. This is so well recognized that in most communities truckers are required either by State statutes or local ordinances to append to the outer rear extremity of the load some form of device which is capable of movement, the better to attract attention.

A safety signalling device embodying my invention comprises a flag A and a hanger B said parts being detachably connected but inseparable when positioned in operative position to act as a signal.

The flag proper may be composed of any suitable material but I prefer to make it of a flexible weather proof substance, such as a sheet of rubber composition of suitable size. In practice I paint it red to increase its visibility and on the rear face provide it with the slogan "Safety first" in white lettering appearing in a horizontal line and of such size as to be readily observed at a considerable distance. On the upper margin of the flag and at its opposite sides are arcuate hanger plates 10—11 one of which carries a projecting eye 12 by means of which the flag is suspended.

The hanger element B comprises two parts one a spike 13 and the other a lever arm 14. The spike has a pointed forward end 15 and an enlarged rear end or head 16 suitable to receive the impact of hammer blows by means of which the spike may be embedded in the squared off end of a log, a piece of heavier timber, or the like, as indicated by Fig. 2. Depending from the spike is a hook 17 with which the eye 12 of the flag A may be engaged. The hook is in the plane of the axis of the spike and its free end 18 curls upwardly and for a portion of its length extends vertically so that a narrow throat 19 is formed between it and the lower side of the spike.

The lower end of the lever 14 is pivoted at 20 to the spike and is bifurcated to straddle the latter and also to embrace the free end 18 of the hook when the lever and spike are substantially at right angles. On the forward edges of the bifurcations are bearing points 21 which upon engagement with the end face of a piece of timber, as occurs when the spike is driven into it, insures that the throat 19 will be closed to prevent the disengagement of the flag A. At a point above pivot 20 the lever is formed with a knee or slight bend 22 which throws the upper extermity of the lever outwardly from the end of the timber sufficiently to facilitate a fingerhold thereon, whereby a workman may easily manipulate the lever to pry the spike loose when it is desired to disconnect the signal device. Where additional security over the holding ability of the spike is desired the lever itself may be fastened to the end of a timber and to facilitate this I provide therein two transverse perforations 23—24 through which nails may be passed, as will be understood.

Since it may often be desirable to use the signal device with loads other than timber, or lumber, or in conjunction with the latter in a more or less finished form, such as boards, which are too thin to receive the spike, I have shaped the parts to enable them to be secured by nails passed through the apertures 23—24. In this instance the handle 14 is laid horizontally over the upper face of a board with the spike extending vertically across and in engagement with the end of the board. In this position the spike is prevented from rocking on its pivot and the free end of the hook extends horizontally to allow the eye 12 to rock thereon.

It will of course be appreciated that the signal device or flag may also be employed in conjunction with construction work as a means for attracting the attention of pedestrians and drivers of motor vehicles and similarly used as a safety warning at street and road intersections and at school crossings.

I claim:

1. In a signal device for projecting tail loads of vehicles, the combination with a flag element having an attaching eye, of a hanger for the flag comprising a spike having a pointed end adapted to be driven into said load and having a depending hook engageable with said eye and an arm pivoted on the spike having a portion located to engage the load and be held thereby in a normal position to close the free end of the hook.

2. In a signal device for projecting tail loads of vehicles, the combination with a flag element having an attaching eye, of a hanger for the flag comprising a spike having a pointed end and a blow receiving end, a hook depending from the latter having its free end facing the pointed end of the spike and a cross arm pivoted at an intermediate point on the spike for engagement with the load when the pointed end of the spike is driven therein and serving by such engagement to prevent the removal of the eye from the hook.

3. In a signal device for projecting tail loads of vehicles, the combination with a flag element having an attaching eye, of a hanger for the flag comprising a spike having an outer head end and a pointed inner end, a hook depending from said head engageable with the flag eye and arranged with its open side facing in the direction of the pointed end of the spike, and a lever arm pivoted crosswise of the spike and engaging the load when the spike is driven therein and serving in one instance to close the open end of the hook and in another to operate as a pry to disengage the spike.

HENRY L. HARDISTY.

REFERENCES CITED

The following references are of record in the file of this patent:

UNITED STATES PATENTS

| Number | Name | Date |
|---|---|---|
| 885,907 | Boucher | Apr. 28, 1908 |
| 1,379,514 | Begley | May 24, 1921 |
| 1,441,539 | Stalder | Jan. 9, 1923 |
| 2,166,520 | Challoner | July 18, 1939 |